US009805282B2

(12) United States Patent
Mase et al.

(10) Patent No.: US 9,805,282 B2
(45) Date of Patent: Oct. 31, 2017

(54) LOCAL FEATURE DESCRIPTOR EXTRACTING APPARATUS, METHOD FOR EXTRACTING LOCAL FEATURE DESCRIPTOR, AND PROGRAM

(75) Inventors: Ryota Mase, Tokyo (JP); Kota Iwamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 14/358,664

(22) PCT Filed: Sep. 11, 2012

(86) PCT No.: PCT/JP2012/073183
§ 371 (c)(1),
(2), (4) Date: May 15, 2014

(87) PCT Pub. No.: WO2013/073273
PCT Pub. Date: May 23, 2013

(65) Prior Publication Data
US 2014/0301647 A1 Oct. 9, 2014

(30) Foreign Application Priority Data
Nov. 18, 2011 (JP) .................................. 2011-253262

(51) Int. Cl.
*G06K 9/00* (2006.01)
*G06K 9/46* (2006.01)

(52) U.S. Cl.
CPC ............. *G06K 9/46* (2013.01); *G06K 9/4671* (2013.01); *G06K 2009/4666* (2013.01)

(58) Field of Classification Search
CPC combination set(s) only.
See application file for complete search history.

(56) References Cited

U.S. PATENT DOCUMENTS 6,711,293 B1  3/2004 Lowe
8,036,497 B2* 10/2011 Kise ................. G06F 17/30247
                                                    358/1.9
(Continued)

FOREIGN PATENT DOCUMENTS

JP  2010-079545 A  4/2010
JP  2010-085240 A  4/2010

OTHER PUBLICATIONS

Ke, Yan. "PCA-SIFT: a more distinctive representation for local image descriptors." IEEE Xplore (Jul. 19, 2004): 1.10.1109/CVPR.2004.1315206.*
International Preliminary Report on Patentability issued by the International Bureau of WIPO for International Application No. PCT/JP2012/073183 mailed May 30, 2014 (5 pgs.).
Lowe, D.G., "Distinctive Image Features From Scale-Invariant Keypoints," International Journal of Computer Vision, vol. 60, No. 2, pp. 91-110 (2004).
Oba, et al., "License Plate Detection Using Locan Features," IEICE Technical Report, vol. 109, No. 418, pp. 1-6 (Feb. 11, 2010).
(Continued)

*Primary Examiner* — Utpal Shah
(74) *Attorney, Agent, or Firm* — Wilmer Cutler Pickering Hale and Dorr LLP

(57) ABSTRACT

The size of a feature descriptor is reduced, with the accuracy of object identification maintained. A local feature descriptor extracting apparatus includes a feature point detecting unit configured to detect a plurality of feature points in an image and output feature point information that is information on each of the feature points, a feature point selecting unit configured to select the predetermined number of feature points from the detected plurality of feature points in order of decreasing importance based on the feature point information, and a local feature descriptor generating unit configured to generate a local feature descriptor that is a feature descriptor in a local region for each of the selected feature points.

6 Claims, 15 Drawing Sheets

(56) References Cited

U.S. PATENT DOCUMENTS

| | | | |
|---|---|---|---|
| 2009/0015676 A1* | 1/2009 | Ke | G06K 9/00463 |
| | | | 348/169 |
| 2010/0074530 A1* | 3/2010 | Magai | G06F 17/30256 |
| | | | 382/195 |
| 2010/0080419 A1 | 4/2010 | Okugi et al. | |
| 2011/0176734 A1* | 7/2011 | Lee | G06K 9/00671 |
| | | | 382/197 |
| 2011/0255781 A1* | 10/2011 | Hamsici | G06K 9/4671 |
| | | | 382/170 |
| 2012/0027290 A1* | 2/2012 | Baheti | G06K 9/6857 |
| | | | 382/154 |
| 2012/0154611 A1* | 6/2012 | Taoka | H04N 5/23245 |
| | | | 348/208.4 |
| 2013/0308860 A1* | 11/2013 | Mainali | G06K 9/4671 |
| | | | 382/170 |
| 2014/0050411 A1* | 2/2014 | Lee | G06K 9/4671 |
| | | | 382/201 |

OTHER PUBLICATIONS

Ono, et al., "Instance-Based Localization Using Local Features," IEICE Technical Report, vol. 109, No. 418, pp. 31-36 (Feb. 11, 2010).

Yamaguchi, et al., "Obstacle Detection in Road Scene Using Monocular Camera," IPSJ SIG Technical Report, vol. 2005, No. 112, pp. 69-76 (Nov. 18, 2005).

International Search Report and Written Opinion issued by the Japanese Patent Office for International Application No. PCT/JP2012/073183 mailed Dec. 11, 2012 (15 pgs.).

Hondo, T., et al., "Inspection of Memory Reduction Methods for Specific Object Recognition," IPSJ Technical Report, Japan, Information Processing Society of Japan, vol. 2009, No. 29, pp. 171-176 (Mar. 14, 2009).

Japanese Office Action issued by the Japan Patent Office for Application No. 2013-544165 dated Sep. 8, 2016 (5 pages).

* cited by examiner

LOCAL FEATURE DESCRIPTOR EXTRACTING APPARATUS, METHOD FOR EXTRACTING LOCAL FEATURE DESCRIPTOR, AND PROGRAM

CROSS-REFERENCE TO RELATED APPLICATIONS

This application is a national stage application of International Application No. PCT/JP2012/073183 entitled "Local Feature Amount Extraction Device, Local Feature Amount Extraction Method, and Program," filed on Sep. 11, 2012, which claims the benefit of the priority of Japanese Patent Application No. 2011-253262, filed on Nov, 18, 2011, the disclosures of each of which are hereby incorporated by reference in their entirety.

BACKGROUND

The present invention relates to a local feature descriptor extracting apparatus, a method for extracting a local feature descriptor, and a program.

Schemes have been proposed which are intended to robustly identify an object in an image in the presence of a change in photographing size or angle or occlusion. The schemes involve detecting a large number of interest points (feature points) in an image and extracting a feature descriptor in a local region (local feature descriptor) around each of the feature points. As a typical scheme, Patent Literature 1 and Non Patent Literature 1 disclose a local feature descriptor extracting apparatus that uses SIFT (Scale Invariant Feature Transform) feature descriptors.

FIG. 15 is a diagram showing an example of a general configuration of a local feature descriptor extracting apparatus that uses SIFT feature descriptors. Furthermore, FIG. 16 is a diagram showing an image of extraction of SIFT feature descriptors in the local feature descriptor extracting apparatus shown in FIG. 15.

As shown in FIG. 15, the local feature descriptor extracting apparatus includes a feature point detecting unit 200, a local region acquiring unit 210, a subregion dividing unit 220, and a subregion feature vector generating unit 230. The feature point detecting unit 200 detects a large number of interest points (feature points) in an image and outputs the coordinate position, scale (size), and orientation of each of the feature points. The local region acquiring unit 210 acquires a local region from which the feature descriptor is to be extracted based on the coordinate value, scale, and orientation of each of the detected feature points. The subregion dividing unit 220 divides the local region into subregions. In an example illustrated in FIG. 16, the subregion dividing unit 220 divides the local region into 16 blocks (4×4 blocks). The subregion feature vector generating unit 230 generates a gradient orientation histogram for each of the subregions of the local region. Specifically, the subregion feature vector generating unit 230 calculates a gradient orientation for each of pixels in each subregion and carries out quantization to obtain eight orientations. Then, the subregion feature vector generating unit 230 aggregates the frequencies of the quantized eight orientations for each subregion to generate a gradient orientation histogram. Thus, the gradient orientation histogram of 16 blocks×eight orientations generated for each feature point is output as 128-dimensional local feature descriptors.

Furthermore, Patent Literature 2 discloses a technique for improving the accuracy of searches and recognitions using local feature descriptors. The technique limits targets for calculation of local feature descriptors to feature points with high reproducibility sufficient to allow the feature points to be extracted even when the corresponding image has been, for example, rotated, enlarged, or reduced.

Patent Literature 1: U.S. Pat. No. 6,711,293
Patent Literature 2: Patent Publication JP-A-2010-79545
Non Patent Literature 1: David G. Lowe, "Distinctive image features from scale-invariant keypoints", (U.S.), International Journal of Computer Vision, 60(2), 2004, p. 91-110

However, the techniques disclosed in Patent Literature 1 and Non Patent Literature 1 generate a local feature descriptor for all feature points extracted from an input image. Thus, the size of the local feature descriptors generated increases consistently with the number of detected feature points. The thus increased size of the local feature descriptors may pose a problem when the local feature descriptors are used to match images with each other (matching). For example, when a user terminal (for example, a portable terminal with a camera) extracts local feature descriptors from an image and transmits the local feature descriptors to a server in order to search for an image similar to the image from which the local feature descriptors have been extracted, a large size of the local feature descriptors increases a communication time. This increases the amount of time until the result of an image search is obtained. Furthermore, a large size of the local feature descriptors increases a processing time when images are matched with each other based on local feature descriptors. In addition, in the image search using local feature descriptors, the local feature descriptors in the image are stored in a memory. However, a large size of the local feature descriptors reduces the number of images for which the local feature descriptors may be stored on the memory. Hence, the use of local feature descriptors is not suitable for large-scale image searches intended for a large number of images.

Furthermore, the technique disclosed in Patent Literature 2 may limit the targets for calculation of the local feature descriptors to the feature points with high reproducibility. However, a large number of feature points with high reproducibility lead to a problem similar to the problem posed by the technique disclosed in Patent Literature 1 or Non Patent Literature 1.

SUMMARY

Thus, an object of the present invention is to reduce the size of feature descriptors with the accuracy of object identification maintained.

A local feature descriptor extracting apparatus according to an aspect of the present invention includes a feature point detecting unit configured to detect a plurality of feature points in an image and output feature point information that is information on each of the feature points, a feature point selecting unit configured to select the predetermined number of feature points from the detected plurality of feature points in order of decreasing importance based on the feature point information, and a local feature descriptor generating unit configured to generate a local feature descriptor that is a feature descriptor in a local region for each of the selected feature points.

Furthermore, in a method for extracting a local feature descriptor according to an aspect of the present invention, a computer detects a plurality of feature points in an image to output feature point information that is information on each of the feature points, selects the predetermined number of feature points from the detected plurality of feature points in order of decreasing importance based on the feature point information, and generates a local feature descriptor that is a feature descriptor in a local region in each of the selected feature points.

Additionally, a program according to an aspect of the present invention causes a computer to implement a function of detecting a plurality of feature points in an image, a function of outputting feature point information that is information on each of the feature points, a function of selecting the predetermined number of feature points from the detected plurality of feature points in order of decreasing importance based on the feature point information, and a function of generating a local feature descriptor that is a feature descriptor in a local region for each of the selected feature points.

According to the present invention, the "unit" does not simply mean physical means but includes implementation of functions of the "unit" by software. Furthermore, the functions of one "unit" or apparatus may be implemented by two or more physical means or apparatuses or the functions of two or more "units" or apparatuses may be implemented by one physical means or apparatus.

The present invention may reduce the size of feature descriptors with the accuracy of object identification maintained.

DETAILED DESCRIPTION

Embodiments of the present invention will be described below with reference to the drawings.

First Embodiment

Figure 1:
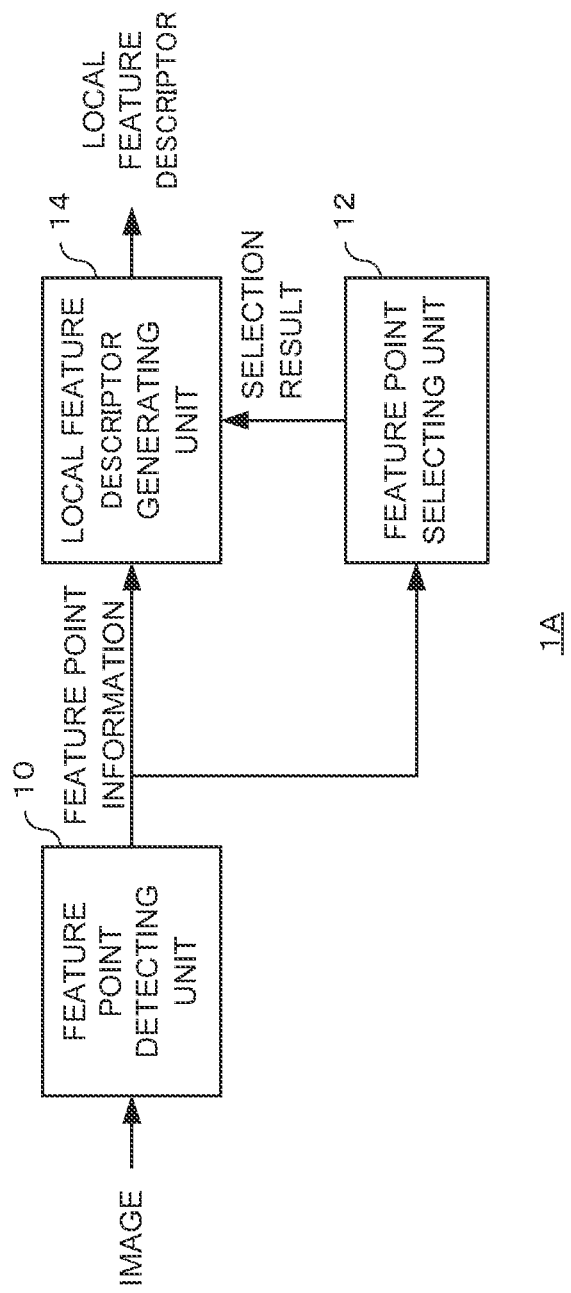
FIG. 1 is a diagram showing a configuration of a local feature descriptor extracting apparatus that is a first embodiment of the present invention.

FIG. 1 is a diagram showing a configuration of a local feature descriptor extracting apparatus that is a first embodiment of the present invention. A local feature descriptor extracting apparatus 1A is configured to include a feature point detecting unit 10, a feature point selecting unit 12, and a local feature descriptor generating unit 14. The local feature descriptor extracting apparatus 1A may be configured, for example, using an information processing apparatus such as a personal computer or a personal digital assistance. Units of the local feature descriptor extracting apparatus 1A may be implemented by, for example, using storage areas such as memories or by a processor executing programs stored in the storage areas. Components in other embodiments described below may be similarly implemented.

The feature point detecting unit 10 detects a large number of interest points (feature points) in an image, and outputs feature point information that is information on each of the feature points. In this case, the feature point information is indicative of the coordinate position or scale of each of the detected local feature points, the orientation of the feature point, a "feature point number" that is a unique ID (identification) assigned to the feature point, or the like.

The feature point detecting unit 10 may output feature point information as separate pieces of feature point information on the respective orientation directions at each feature point. For example, it is possible that the feature point detecting unit 10 outputs feature point information only on the most dominant orientation direction at each feature point or also on the second and subsequent most dominant orientation directions. Furthermore, when also outputting feature point information on the second and subsequent most dominant orientation directions, the feature point detecting unit 10 may impart different feature point numbers to the respective orientation directions at each feature point.

An image in which feature points are to be detected may be a still image or a moving image (or a short video clip), for example, an image taken using an image pickup device such as a digital camera, a digital video camera, or a cellular phone, or an image captured through a scanner or the like.

Furthermore, the image may be compressed like JPEG (Joint Photographic Experts Group) images or uncompressed like TIFF (Tagged Image File Format) images.

Additionally, the image may be a compressed moving image or a decoded compressed moving image. When the image is a moving image, the feature point detecting unit 10 may detect feature points in each frame image constituting the moving image. In addition, when the image is a compressed moving image, any decodable compression format may be used, for example, MPEG (Moving Picture Experts Group), MOTION JPEG, or WINDOWS Media Video (WINDOWS and WINDOWS Media are registered trademarks).

In detecting feature points in an image to extract feature point information from the feature points, the feature point detecting unit 10 may use, for example, a DoG (Difference-of-Gaussian) process. Specifically, the feature point detecting unit 10 may determine the position and scale of each feature point by carrying out an extremum search in a scale space using the DoG process. The feature point detecting unit 10 may further calculate the orientation of the feature points using the determined position and scale of the feature point and gradient information on surrounding areas. In detecting the feature points in the image to extract the feature point information, the feature point detecting unit 10 may use another technique such as Fast-Hessian Detector instead of DoG.

The feature point selecting unit 12 selects a specified number (predetermined number) of feature points from the detected feature points based on feature point information output by the feature point detecting unit 10. Then, the feature point selecting unit 12 outputs the feature point numbers for the selected feature points, information indicative of the order of importance, or the like as the result of selection of the feature points.

The feature point selecting unit 12 may, for example, pre-hold specified-number information indicative of the "specified number" of the selected feature points. The specified-number information may be, for example, defined in a program or stored in a table or the like which is referenced by the program. Alternatively, the specified-number information may be information indicative of the specified number itself or information indicative of the total size (for example, the number of bytes) of local feature descriptors in the image. When the specified-number information is information indicative of the total size of the local feature descriptors in the image, the feature point selecting unit 12 may calculate the specified number by, for example, dividing the total size by the size of the local feature descriptor at one feature point.

Figure 2:
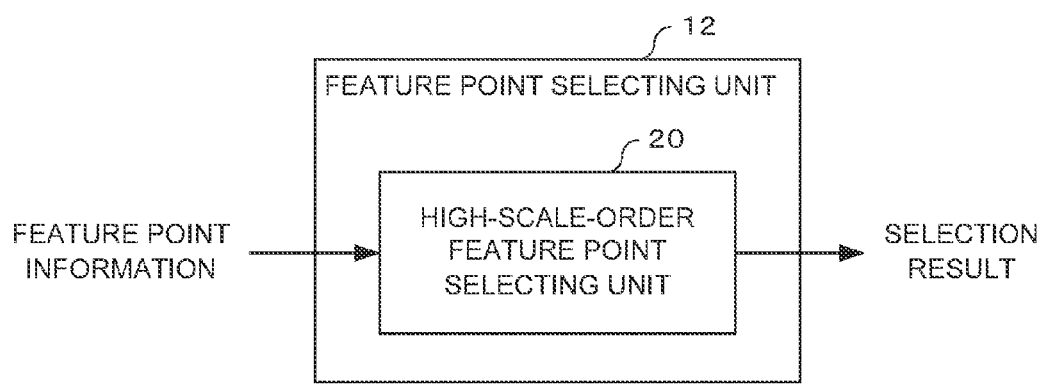
FIG. 2 is a diagram showing an example of a configuration of a feature point selecting unit.

With reference to FIG. 2 to FIG. 5, an example of a configuration of the feature point selecting unit 12 will be described. As shown in FIG. 2, the feature point selecting unit 12 may be configured to include a high-scale-order feature point selecting unit 20. The high-scale-order feature point selecting unit 20 may select the specified number of feature points in order of decreasing scale based on the feature point information output by the feature point detecting unit 10.

Specifically, the high-scale-order feature point selecting unit 20 rearranges the feature points according to the order of the scales of all the feature points based on the feature point information, and imparts importance to the feature points in order of decreasing scale. The high-scale-order feature point selecting unit 20 then selects feature points in order of decreasing importance. When the specified number of feature points are selected, information on the selected feature points is output as the result of the selection. The high-scale-order feature point selecting unit 20 may, for example, output the feature point numbers uniquely assigned to the respective feature points as the result of the selection.

In general, the distribution of feature points detected in an image is such that a large number of feature points are distributed at smaller scales and that the number of feature points distributed at a scale decreases with increasing scale. Thus, the high-scale-order feature point selecting unit 20 may eventually select feature points with a wide range of scales by selecting feature points in order of decreasing scale. The selection of feature points with a wide range of scales enables the widely varying size of objects in the image to be dealt with. As a result, the number of feature points intended for feature descriptor description can be reduced substantially without decreasing the accuracy of an application for image search, object detection, or the like.

Figure 3:
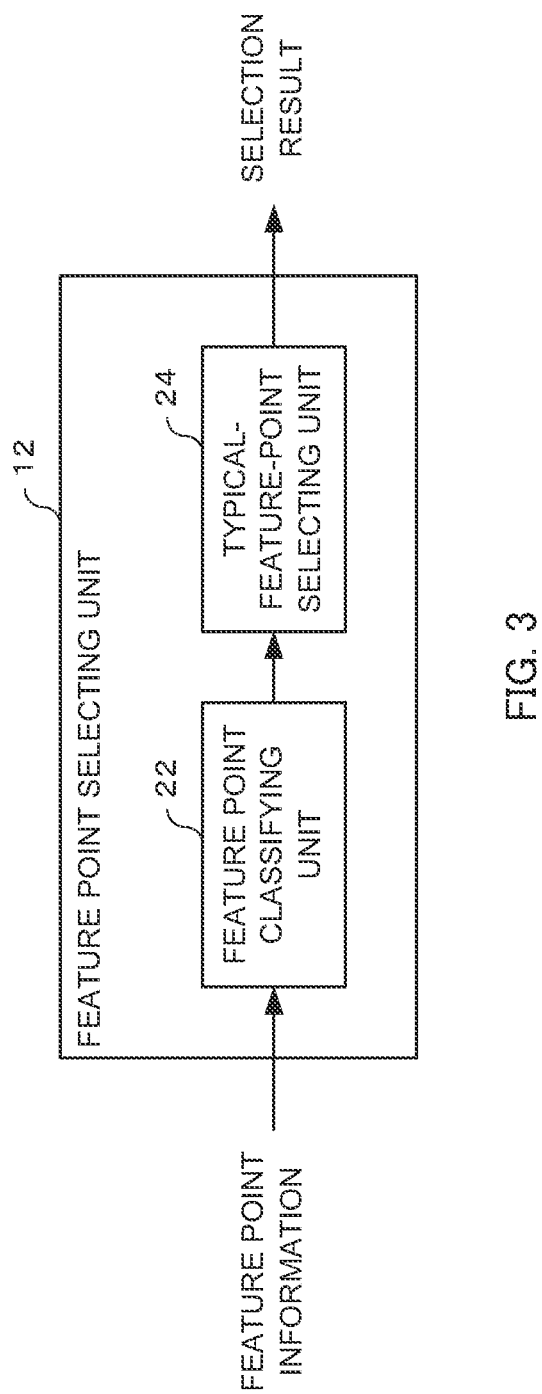
FIG. 3 is a diagram showing an example of the configuration of the feature point selecting unit.

As shown in FIG. 3, the feature point selecting unit 12 may be configured to include a feature point classifying unit 22 and a typical-feature-point selecting unit 24. The feature point classifying unit 22 may classify the detected plurality of feature points into a plurality of groups based on the feature point information. The typical-feature-point selecting unit 24 may select the specified number of feature points by selecting at least one feature point from each group.

Specifically, the feature point classifying unit 22 calculates the density of feature points in spatial orientations, for example, using information on the coordinate position of each feature point included in the feature point information. The feature point classifying unit 22 then divides the feature points into groups each of feature points at close coordinate positions and assigns a unique identifier to each of the groups. The feature point classifying unit 22 may thus output information indicating to which group with the unique identifier each feature point belongs, as spatial-orientation feature point density information.

By selecting the specified number of feature points based on the spatial-orientation feature point density information, the typical-feature-point selecting unit 24 may output information on the selected feature points as the result of the selection. For example, upon receiving the information indicating to which group each feature point belongs as the spatial-orientation feature point density information, the typical-feature-point selecting unit 24 may select a feature point with the largest scale in each group or the most isolated feature point in the group (for example, a feature point with the largest sum, in the group, of the distances between this feature point and each of all the feature points present in the group).

Furthermore, the typical-feature-point selecting unit 24 may determine that a feature point selected from a group with a small number of feature points is more important and that a feature point selected from a group with a large number of feature points is less important.

When the number of feature points selected from each group is larger than the specified value, the typical-feature-point selecting unit 24 may, for example, reduce the number of feature points down to the specified value based on the importance and output information on the selected feature points as the result of the selection. At this time, the typical-feature-point selecting unit 24 may select feature points in order of decreasing importance.

On the other hand, when the number of feature points selected from each group is smaller than the specified value, the typical-feature-point selecting unit 24 may further select one feature point from each group in order of increasing number of feature points in the group.

In general, feature points selected from an image may concentrate in a particular area in the image, and information provided by the feature points may be redundant. In a configuration shown in FIG. 3, the typical-feature-point selecting unit 24 may select feature points evenly from the entire image by taking the density of feature points in the spatial orientations. Thus, the number of feature points intended for feature descriptor description may be reduced substantially without decreasing the accuracy of an application for image search, object detection, or the like.

The technique for classifying the feature points is not limited to the technique based on the density of feature points in the spatial orientations. For example, the feature point classifying unit 22 may further classify the feature points based on the similarity between the orientations of feature points in the group in addition to the density of feature points in the spatial orientations. For example, the feature point classifying unit 22 may check the orientations of the most adjacent feature points (feature points closest to each other) in the group resulting from the classification based on the density of feature points in the spatial orientations. When the orientations are very similar, the feature point classifying unit 22 may classify these feature points into the same group. When the orientations are not similar, the feature point classifying unit 22 may classify the feature points into separate groups.

Instead of carrying out the two-step process of classifying the feature points based on the density of feature points in the spatial orientations and then classifying the feature points based on the orientation of each feature point, the feature point classifying unit 22 may classify the feature points taking both the density of feature points in the spatial orientations and the similarity of the orientation into account at the same time.

Figure 4:
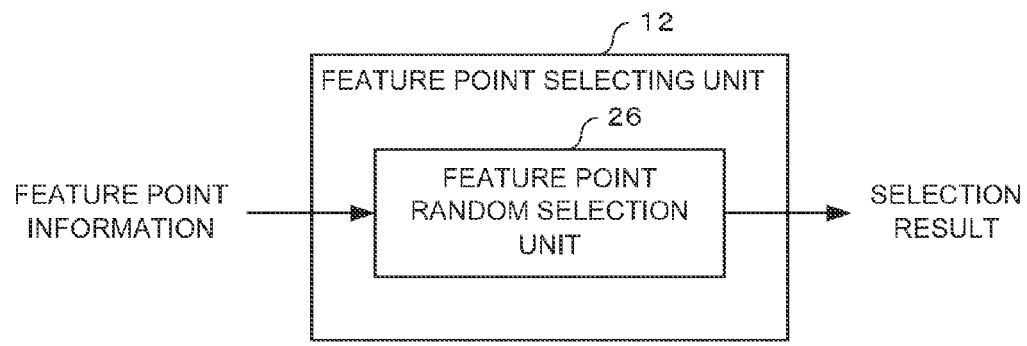
FIG. 4 is a diagram showing an example of the configuration of the feature point selecting unit.

As shown in FIG. 4, the feature point selecting unit 12 may be configured to include a feature point random selection unit 26. The feature point random selection unit 26 may randomly imparts importance to all of the feature points and select feature points in order of decreasing importance. When the specified number of feature points are selected, the feature point random selection unit 26 may output information on the selected feature points as the result of the selection.

In general, the distribution of feature points detected in an image is such that a large number of feature points are distributed at smaller scales and that the number of feature points distributed at a scale decreases with increasing scale. Thus, when the feature point random selection unit 26 randomly imparts importance to the feature points and selects feature points in order of decreasing importance, the feature points may ideally be selected with the above-described distribution shape maintained. Eventually, feature points with a wide range of scales are selected, enabling the widely varying size of objects in the image to be dealt with. As a result, the number of feature points intended for feature descriptor description may be reduced substantially without decreasing the accuracy of an application for image search, object detection, or the like.

Figure 5:
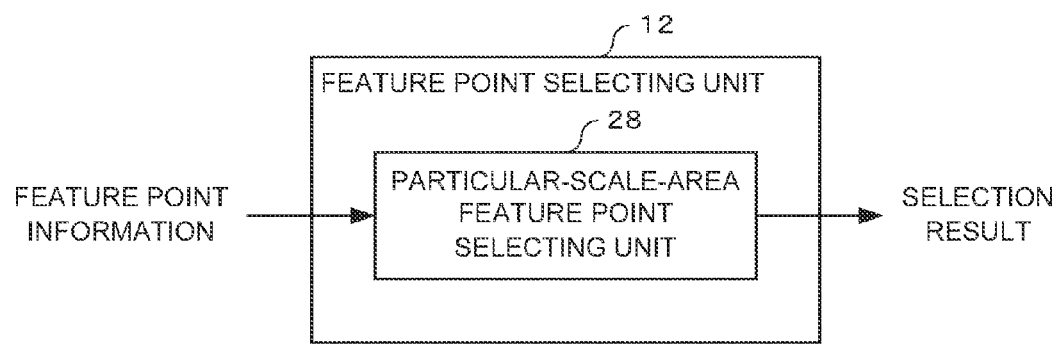
FIG. 5 is a diagram showing an example of the configuration of the feature point selecting unit.

As shown in FIG. 5, the feature point selecting unit 12 may be configured to include a particular-scale-area feature point selecting unit 28. The particular-scale-area feature point selecting unit 28 may select only feature points included in a particular scale area in the scales of all the feature points based on the feature point information.

When the number of selected feature points is larger than the specified value, the particular-scale-area feature point selecting unit 28 may, for example, reduce the number of feature points down to the specified value based on the importance and output information on the selected feature points as the result of the selection. At this time, the particular-scale-area feature point selecting unit 28 may select feature points in order of decreasing importance.

For example, the particular-scale-area feature point selecting unit 28 may determine feature points with a scale closer to the center of a scale area intended for selection to be more important and select feature points in order of decreasing importance. Alternatively, the particular-scale-area feature point selecting unit 28 may determine feature points with larger scales within the scale area intended for selection to be more important and select feature points in order of decreasing importance.

On the other hand, when the number of feature points included in the particular scale area is smaller than the specified value, the particular-scale-area feature point selecting unit 28 may, for example, determine feature points closer to the scale area to be more important and newly select feature points in order from scale areas preceding and succeeding the above-described scale area.

In an application for image search, object detection, or the like, the sizes of objects on an image registered on a database side may be known, and between a query-side image and the database-side image, the ratio of the sizes of the objects in the image may be assumable. In this case, provided that those of the database-side feature points which are more important can be known, feature points may be effectively selected in a concentrated manner based on a scale area determined by applying compensation corresponding to the ratio of the object sizes between the query-side image and the database-side image, to the scales of the feature points. Any technique may be used to know those of the database-side feature points which are more important. For example, a saliency map or the like may be used to pre-identify an area of interest in the database-side image so that feature points detected in the area of interest can be defined to be more important. Alternatively, for example, feature points with larger scales may be defined to be more important.

As seen again in FIG. 1, the local feature descriptor generating unit 14 receives the feature point information output by the feature point detecting unit 10 and the selection result output by the feature point selecting unit 12. The local feature descriptor generating unit 14 then generates (describes) a local feature descriptor that is a feature descriptor in a local region for each of the selected feature points. The local feature descriptor generating unit 14 may output the local feature descriptor in a format in which the local feature descriptor is subjected to lossless compression using ZIP, LZH, or the like.

The local feature descriptor generating unit 14 may generate and output local feature descriptors for the feature points in order of decreasing importance of the feature point. Alternatively, the local feature descriptor generating unit 14 may generate and output local feature descriptors for the feature points according to the order of the coordinate position of the feature point. When local feature descriptors for the feature points are generated in order of decreasing importance of the feature point, a matching process can be carried out using the local feature descriptors only for some feature points instead of utilizing the local feature descriptors for all of the selected feature points.

For example, to receive information indicative of the order of importance of the selected feature points and feature point number information as the result of the selection, the local feature descriptor generating unit 14 may determine the feature points corresponding to the feature point numbers to be targets for feature descriptor generation.

Figure 6:
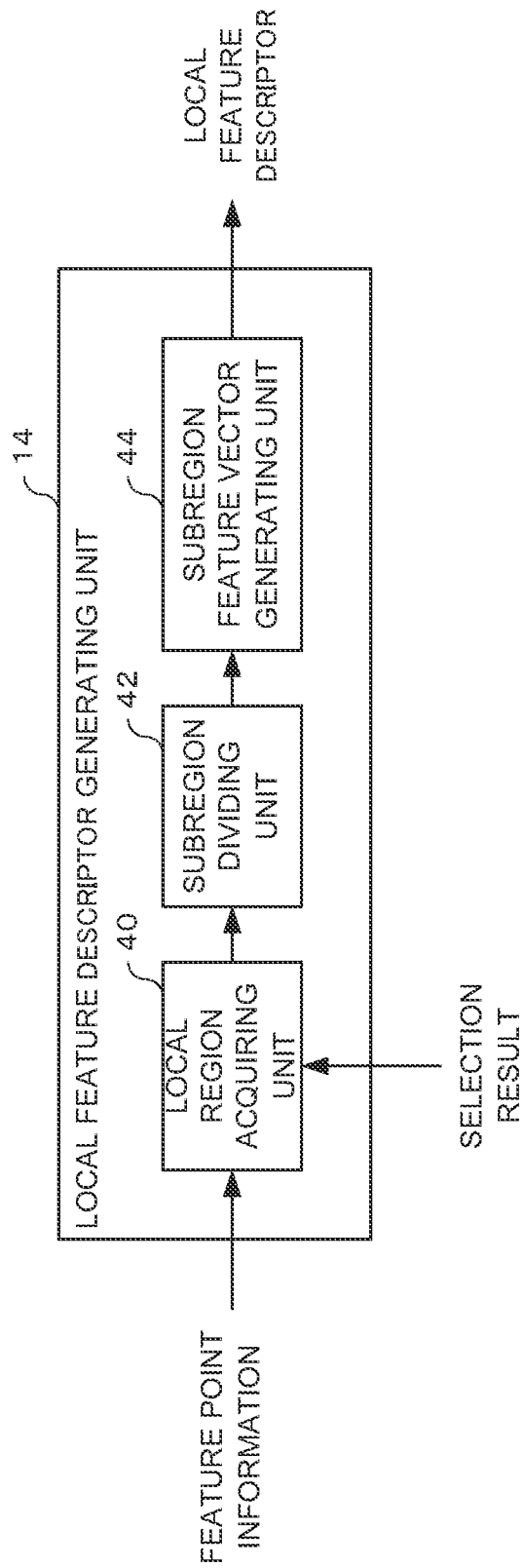
FIG. 6 is a diagram showing an example of a configuration of a local feature descriptor generating unit.

FIG. 6 is a diagram showing an example of a configuration of the local feature descriptor generating unit 14. As shown in FIG. 6, the local feature descriptor generating unit 14 may be configured to include a local region acquiring unit 40, a subregion dividing unit 42, and a subregion feature vector generating unit 44.

The local region acquiring unit 40 acquires, on the basis of the feature descriptor information, local regions from which feature descriptors are to be extracted based on the coordinate value, scale, and orientation of each of the detected feature points. When a plurality of pieces of feature point information with different orientations is present for one feature point, the local feature descriptor generating unit 14 may acquire a local region for each of the plurality of pieces of feature point information.

Figure 16:
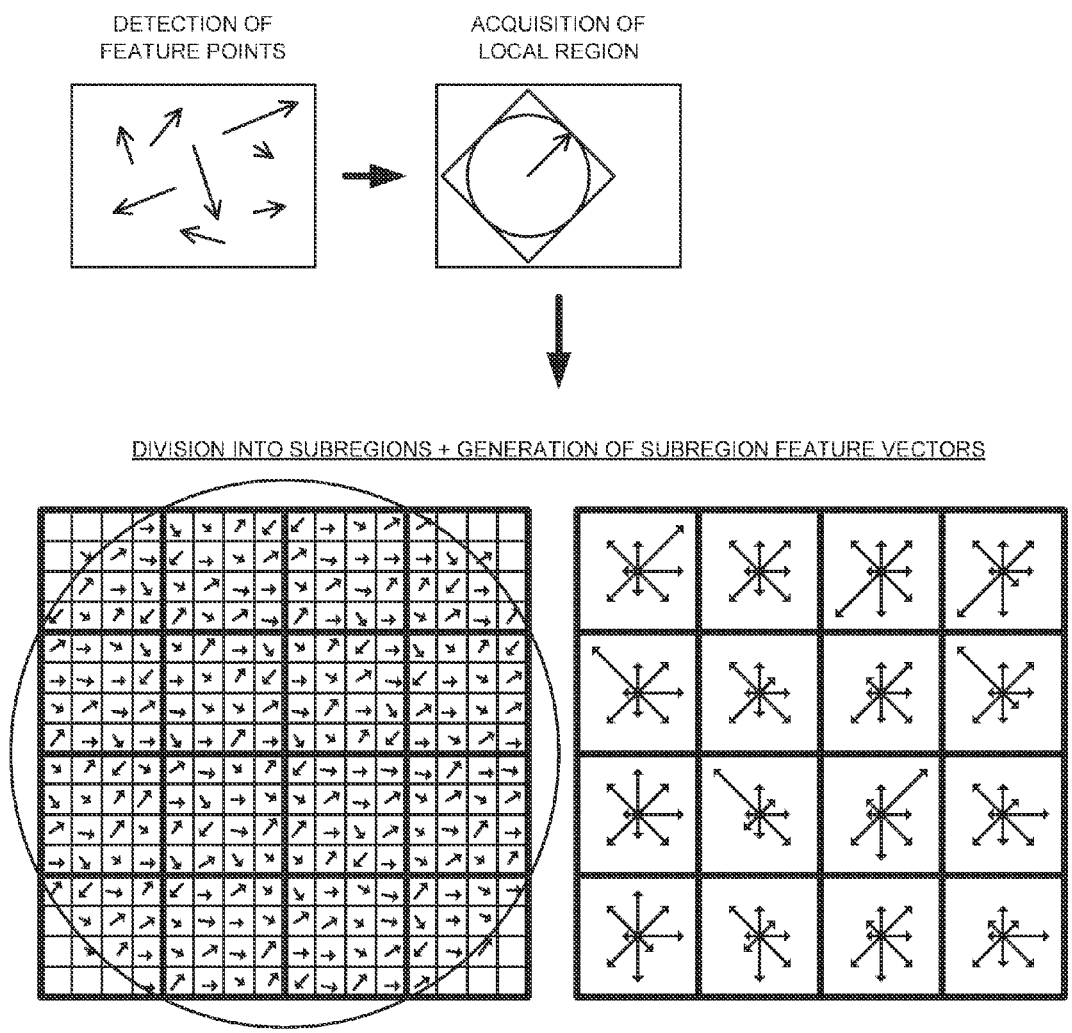
FIG. 16 is a diagram showing an image of extraction of SIFT feature descriptors in the local feature descriptor extracting apparatus.

The subregion dividing unit 42 normalizes the local region by rotating the local region according the orientation direction of the feature point, and then divides the normalized local region into subregions. For example, the subregion dividing unit 42 may divide the local region into 16 blocks (4×4 blocks) as shown in FIG. 16.

The subregion feature vector generating unit 44 generates a feature vector for each of the subregions of the local region. The feature vector for the subregion may be, for example, gradient orientation histogram. Specifically, the subregion feature vector generating unit 44 calculates a gradient orientation for each of the pixels in each subregion and carries out quantization to obtain eight orientations. Then, the subregion feature vector generating unit 44 aggregates the frequencies of the quantized eight orientations for each subregion to generate a gradient orientation histogram. In this case, the subregion feature vector generating unit 44 outputs, as a local feature descriptor, a feature vector formed of the gradient orientation histogram of 16 blocks×eight orientations generated for each feature point. The feature vector for the subregion is not limited to the gradient orientation histogram but may have a plurality of dimensions (elements) such as color information.

Furthermore, the subregion feature vector generating unit 44 may output the coordinate position information on the feature points included in the local feature descriptors. The subregion feature vector generating unit 44 may further output the scale information on the selected feature points included in the local feature descriptors.

In an application for image search, object detection, or the like, when the same object appears in the query (search request) side image and in the database side image, the scale ratio of corresponding feature points in the respective images is approximately constant. Thus, including the scale information in the local feature descriptors enables matching accuracy for the feature descriptors to be improved.

Figure 7:
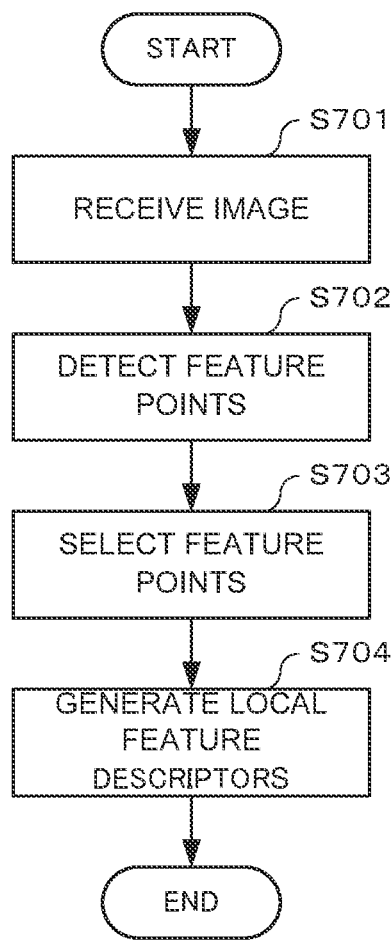
FIG. 7 is a flowchart showing an example of processing in the local feature descriptor extracting apparatus according to the first embodiment.

FIG. 7 is a flowchart showing an example of processing in the local feature descriptor extracting apparatus 1A. First, the feature point detecting unit 10 receives an image for which local feature descriptors are to be generated (S701). The feature point detecting unit 10 detects feature points in the received image, and outputs feature point information including the coordinate positions, scales, orientations, feature point numbers, and the like of the feature points (S702). Then, the feature point selecting unit 12 selects from the detected feature points the specified number of feature points in order of decreasing importance based on the feature point information, and outputs the result of the selection (S703). Finally, the local feature descriptor generating unit 14 generates local feature descriptors for the selected feature points, and outputs the local feature descriptors in order of decreasing order (S704).

Thus, in the local feature descriptor extracting apparatus 1A, the feature point selecting unit 12 selects on the basis of the feature point information the predetermined number of feature points from the detected plurality of feature points in order of decreasing importance. Then, the local feature descriptor generating unit 14 generates a local feature descriptor for each of the selected feature points. Compared to generation of local feature descriptors for all of the detected feature points, the generation of a local feature descriptor for each of the selected feature points enables a reduction in the size of local feature descriptors. In other words, the size of local feature descriptors may be controlled to a size depending on the specified number. Moreover, since the feature points for which local feature descriptors are to be generated are selected in order of decreasing importance, the accuracy of object identification may be maintained. Furthermore, the reduced size of local feature descriptors enables a reduction in communication time and processing time when image search is carried out using local feature descriptors.

Second Embodiment

Figure 8:
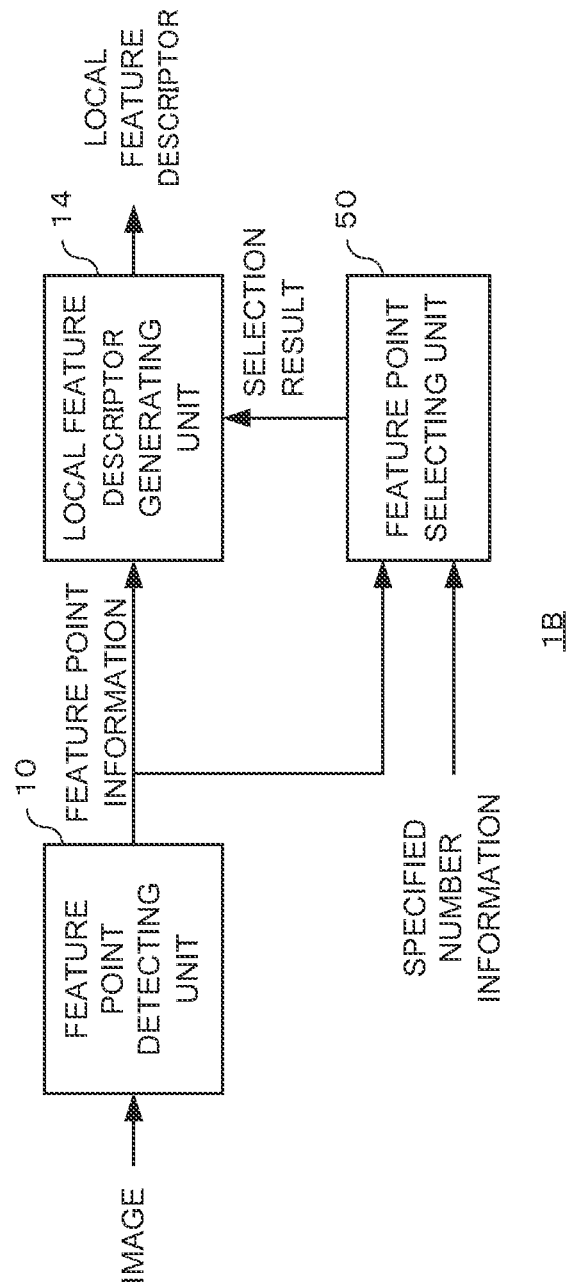
FIG. 8 is a diagram showing a configuration of a local feature descriptor extracting apparatus that is a second embodiment of the present invention.

Now, a second embodiment will be described. FIG. 8 is a diagram showing a configuration of a local feature descriptor extracting apparatus that is the second embodiment of the present invention. As shown in FIG. 8, the local feature descriptor extracting apparatus 1B is configured to include a feature point detecting unit 10, a feature point selecting unit 50, and a local feature descriptor generating unit 14. Thus, in the local feature descriptor extracting apparatus 1B, the feature point selecting unit 12 in the local feature descriptor extracting apparatus 1A according to the first embodiment is changed to the feature point selecting unit 50. The same components of the second embodiment as the corresponding components of the first embodiment are denoted by the same reference numerals and will not be described below.

The feature point selecting unit 50 is different from the feature point selecting unit 12 in the local feature descriptor extracting apparatus 1A according to the first embodiment in that the feature point selecting unit 50 receives specified-number information that is information used to determine a specified number for selection of feature points. The feature point selecting unit 50 determines the specified number based on the specified-number information and selects a specified number of feature points as is the case with the first embodiment. The specified-number information may be information indicative of the specified number itself or information indicative of the total size (for example, the number of bytes) of local feature descriptors in an image. When the specified-number information is information indicative of the total size of the local feature descriptors in the image, the feature point selecting unit 50 may calculate the specified number by, for example, dividing the total size by the size of the local feature descriptor at one feature point.

Thus, in the local feature descriptor extracting apparatus 1B, the feature point selecting unit 50 may determine the specified number based on the externally input specified-number information. In other words, the number of feature points selected by the feature point selecting unit 50 may be controlled based on the external input to the local feature descriptor extracting apparatus 1B. Hence, the size of local feature descriptors may be controlled to a desired size with the accuracy of object identification maintained.

Third Embodiment

Figure 9:
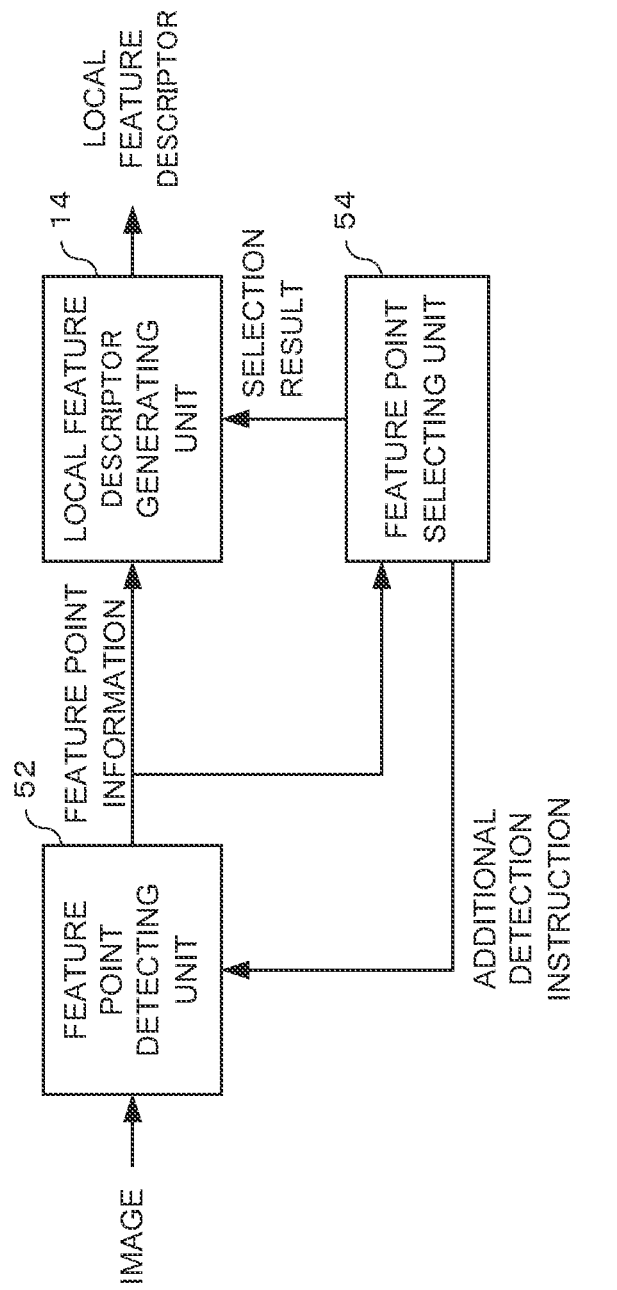
FIG. 9 is a diagram showing a configuration of a local feature descriptor extracting apparatus that is a third embodiment of the present invention.

Now, a third embodiment will be described. FIG. 9 is a diagram showing a configuration of a local feature descriptor extracting apparatus that is the third embodiment of the present invention. As shown in FIG. 9, a local feature descriptor extracting apparatus 1C is configured to include a feature point detecting unit 52, a feature point selecting unit 54, and a local feature descriptor generating unit 14. Thus, in the local feature descriptor extracting apparatus 1C, the feature point detecting unit 10 and feature point selecting unit 12 in the local feature descriptor extracting apparatus 1A according to the first embodiment are changed to the feature point detecting unit 52 and the feature point selecting unit 54. The same components of the third embodiment as the corresponding components of the first embodiment are denoted by the same reference numerals and will not be described below.

The feature point detecting unit 52 detects feature points in an image and outputs feature point information as is the case with the first embodiment. Furthermore, upon receiving an additional detection instruction from the feature point selecting unit 54, the feature point detecting unit 52 changes a parameter for detection of feature points so as to allow more feature points to be detected, and then additionally detects feature points. In this case, the parameter for detection of feature points may be, for example, the number of orientations accepted for each feature point, a DoG value for a point detected as a feature point when an extremum search is carried out in the scale space using the DoG process, or a differential value between a point detected as a feature point and a peripheral pixel.

The feature point selecting unit 54 selects feature points from feature points detected by the feature point detecting unit 52. The feature point selecting unit 54 may select all of the feature points detected by the feature point detecting unit 52 or select some of the feature points in order of decreasing importance as is the case with the first embodiment. Then, when the number of the selected feature points is smaller than a specified number, the feature point selecting unit 54 outputs an additional detection instruction to the feature point detecting unit 52 to allow the feature point detecting unit 52 to further detect feature points.

An initial value for the parameter in the feature point detecting unit 52 may be set, for example, to limit the number of feature points detected to a small value. In this case, the feature point selecting unit 54 may determine that feature points selected using the initial value of the parameter are more important. Furthermore, the parameter may be changed to allow more feature points to be detected than when the detection parameter is set to the initial value. Then, the feature point selecting unit 54 may determine that feature points detected using the changed parameter are less important than the feature points detected using the initial value of the parameter.

Figure 10:
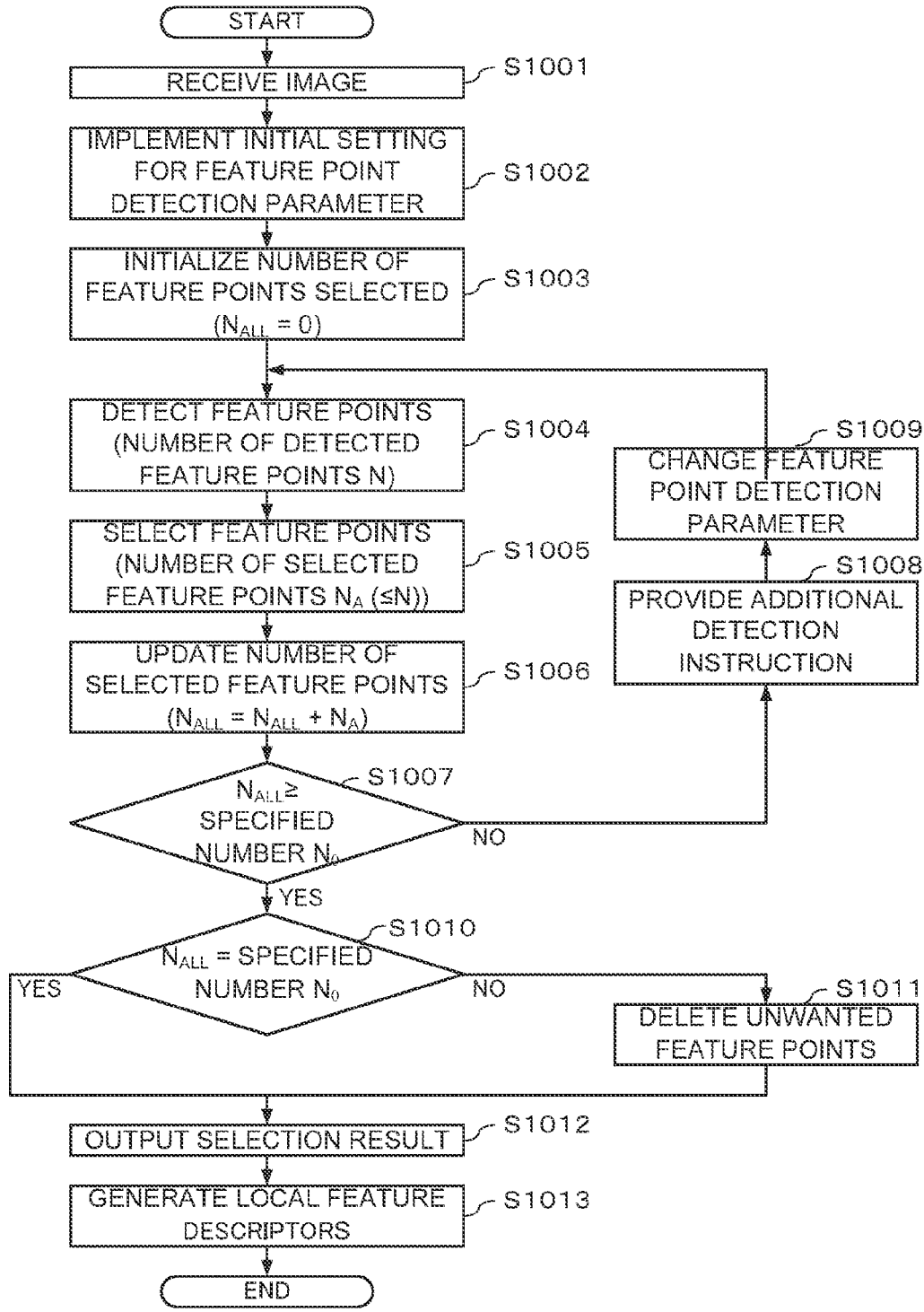
FIG. 10 is a flowchart showing an example of processing in the local feature descriptor extracting apparatus according to the third embodiment.

FIG. 10 is a flowchart showing an example of processing in the local feature descriptor extracting apparatus 1C. First, the feature point detecting unit 52 receives an image for which local feature descriptors are to be generated (S1001). The feature point detecting unit 52 sets the parameter for detection of feature points to the initial value (S1002). Furthermore, the feature point selecting unit 54 initializes a variable indicative of the number of feature points selected (S1003). In this case, a variable indicative of the total number of selected feature points is denoted by $N_{ALL}$, and $N_{ALL}$ is set to zero by initialization.

The feature point detecting unit 52 detects feature points in the image in accordance with the parameter (S1004). In this case, a variable indicative of the number of feature points detected is denoted by N. The feature point selecting unit 54 selects feature points from the detected feature points (S1005). In this case, a variable indicative of the number of newly selected feature points is denoted by $N_A$. The feature point selecting unit 54 uses the number of the newly selected feature points to update the total number of selected feature points (S1006). Specifically, the total number of selected feature points is updated by calculating an equation $N_{ALL}=N_{ALL}+N_A$.

The feature point selecting unit 54 checks whether the total number of selected feature points $N_{ALL}$ is equal to or larger than a specified number $N_0$ (S1007). Then, when the total number of selected feature points $N_{ALL}$ is smaller than the specified number $N_0$ (S1007: NO), the feature point selecting unit 54 outputs an instruction to additionally detect feature points to the feature point detecting unit 52 (S1008). Upon receiving the additional detection instruction, the feature point detecting unit 52 changes the parameter so as to allow feature points to be additionally detected (S1009) and detects feature points as described above (S1004). The feature point selecting unit 54 selects feature points from newly selected feature points (S1005). Thus, the parameter is repeatedly changed until the total number of selected feature points becomes equal to or larger than the specified number.

When the total number of selected feature points $N_{ALL}$ is equal to or larger than the specified number $N_0$ (S1007: YES), the feature point selecting unit 54 checks whether the total number of selected feature points $N_{ALL}$ is equal to the specified number $N_0$ (S1010). When the total number of selected feature points $N_{ALL}$ is not equal to the specified number $N_0$ (S1010: NO), the feature point selecting unit 54 deletes unwanted feature points so as to make the total number of selected feature points $N_{ALL}$ equal to the specified number $N_0$ (S1011). For example, the feature point selecting unit 54 may make the total number of selected feature points equal to the specified number $N_0$ by deleting some of the selected feature points in order of increasing importance. The feature point selecting unit 54 then outputs the result of the selection of feature points to the local feature descriptor generating unit 14 (S1012). Finally, the local feature descriptor generating unit 14 generates local feature descriptors for the selected feature points and outputs the local feature descriptors in order of decreasing importance (S1013).

As described above, in the local feature descriptor extracting apparatus 1C, the feature point selecting unit 54 allows the feature point detecting unit 52 to further detect feature points when the number of feature points selected from the detected feature points is smaller than the specified number. Thus, for example, the feature point detecting unit 52 may initially set the parameter so as to allow the feature point detecting unit 52 to detect only a small number of feature points and change the parameter on a step by step basis until the number of feature points selected by the feature point selecting unit 54 becomes equal to the specified number. This process enables a reduction in the size of the local feature descriptor compared to the generation of local feature descriptors for all of a large number of detected feature points. Moreover, the feature points for which local feature descriptors are to be generated are selected in order of decreasing importance, and thus, the accuracy of object identification can be maintained.

Fourth Embodiment

Figure 11:
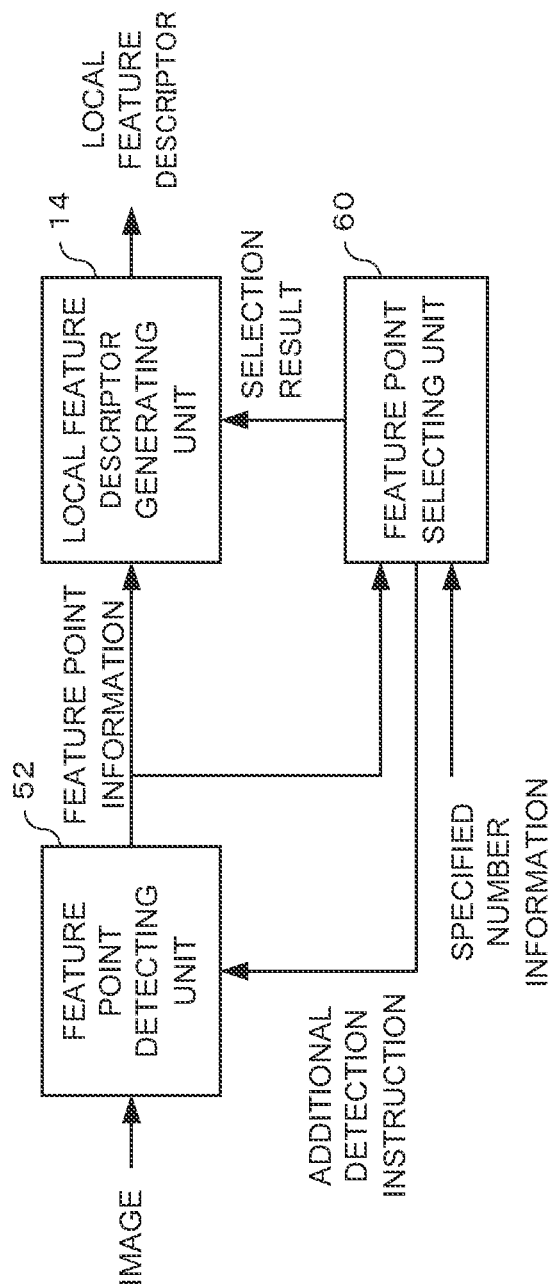
FIG. 11 is a diagram showing a configuration of a local feature descriptor extracting apparatus that is a fourth embodiment of the present invention.

Now, a fourth embodiment will be described. FIG. 11 is a diagram showing a configuration of a local feature descriptor extracting apparatus that is the fourth embodiment of the present invention. As shown in FIG. 11, a local feature descriptor extracting apparatus 1D is configured to include a feature point detecting unit 52, a feature point selecting unit 60, and a local feature descriptor generating unit 14. Thus, in the local feature descriptor extracting apparatus 1D, the feature point selecting unit 54 in the local feature descriptor extracting apparatus 1C according to the third embodiment is changed to the feature point selecting unit 60. The same components of the fourth embodiment as the corresponding components of the third embodiment are denoted by the same reference numerals and will not be described below.

The feature point selecting unit 60 is different from the feature point selecting unit 54 in the local feature descriptor extracting apparatus 1C according to the third embodiment in that the feature point selecting unit 60 receives specified-number information that is information used to determine a specified number for selection of feature points. The feature point selecting unit 60 determines the specified number based on the specified-number information. The feature point selecting unit 60 then selects feature points and outputs an instruction to additionally detect feature points to the feature point detecting unit 52 as necessary, as is the case with the third embodiment. The specified-number information may be information indicative of the specified number itself or information indicative of the total size (for example, the number of bytes) of local feature descriptors in an image. When the specified-number information is information indicative of the total size of the local feature descriptors in the image, the feature point selecting unit 60 may calculate the specified number by, for example, dividing the total size by the size of the local feature descriptor at one feature point.

Thus, in the local feature descriptor extracting apparatus 1D, the feature point selecting unit 60 may determine the specified number based on the externally input specified-number information. In other words, the number of feature points selected by the feature point selecting unit 60 may be controlled based on the external input to the local feature descriptor extracting apparatus 1D. Hence, the size of local feature descriptors may be controlled to a desired size with the accuracy of object identification maintained.

Fifth Embodiment

Figure 12:
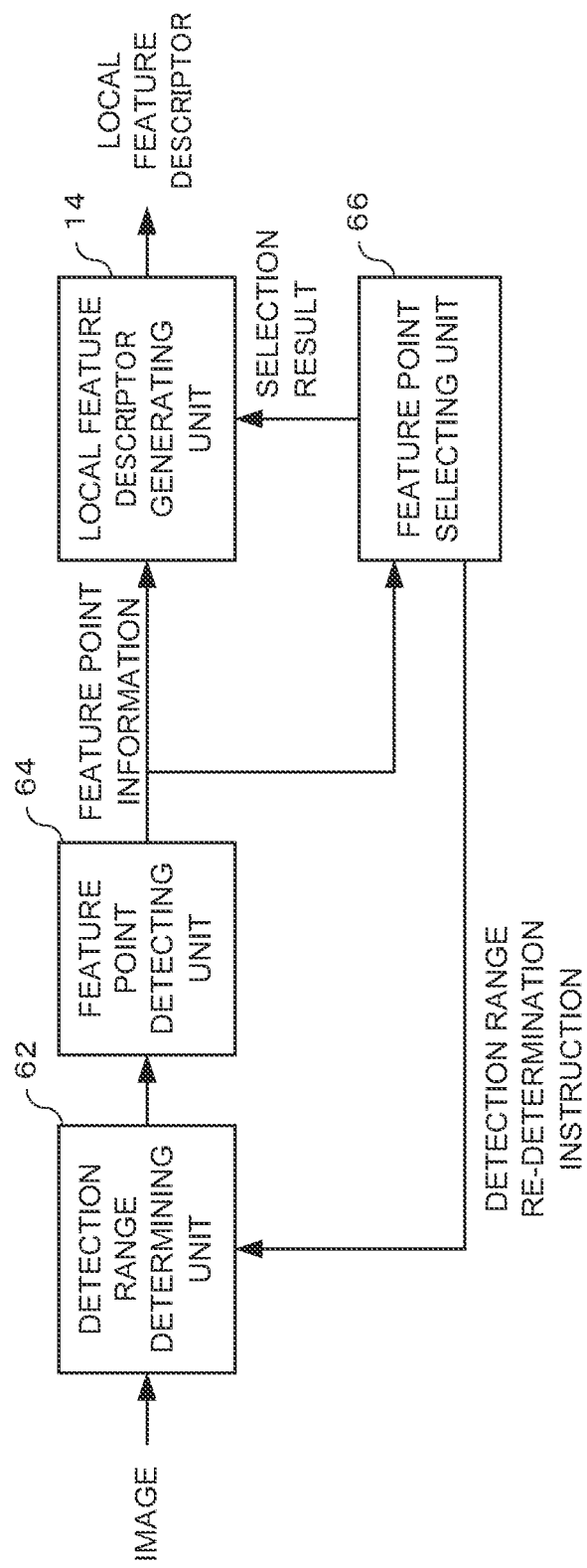
FIG. 12 is a diagram showing a configuration of a local feature descriptor extracting apparatus that is a fifth embodiment of the present invention.

Now, a fifth embodiment will be described. FIG. 12 is a diagram showing a configuration of a local feature descriptor extracting apparatus that is the fifth embodiment of the present invention. As shown in FIG. 12, a local feature descriptor extracting apparatus 1E is configured to include a detection range determining unit 62, a feature point detecting unit 64, a feature point selecting unit 66, and a local feature descriptor generating unit 14. The same components of the fifth embodiment as the corresponding components of the first embodiment are denoted by the same reference numerals and will not be described below.

The detection range determining unit 62 determines the range of detection of feature points for the feature point detecting unit 64. Furthermore, upon receiving a detection range re-determination instruction from the feature point selecting unit 66, the detection range determining unit 62 re-determines the detection range so as to extend the range of detection of feature points. When an extremum search in the scale space based on the DoG process is used by the feature point detecting unit 64 in detecting feature points, the detection range determining unit 62 may determine only DoG images generated at a scale equal to or higher than a certain threshold to be the range of detection of feature points. Furthermore, the detection range determining unit 62, for example, may identify an area of interest in an image using a saliency map and determine the area to be the range of detection of feature points.

The feature point detecting unit 64 detects feature points in the image as is the case with the first embodiment within the range determined by the detection range determining unit 62.

The feature point selecting unit 66 selects feature points from feature points detected by the feature point detecting unit 64. The feature point selecting unit 66 may select all of the feature points detected by the feature point detecting unit 64 or select some of the feature points in order of decreasing importance as is the case with the first embodiment. Then, when the number of the selected feature points is smaller than a specified number, the feature point selecting unit 66 outputs a detection range re-determination instruction to the detection range determining unit 62 to allow the detection range determining unit 62 to further determine the detection range.

An initial detection range may be set, for example, to limit the number of feature points detected to a small value. In this case, the feature point selecting unit 66 may determine that feature points detected using the initial detection range are more important. Furthermore, the detection range may be changed to allow more feature points to be detected than when the initial detection range is used for the detection. Then, the feature point selecting unit 66 may determine that feature points detected using the changed detection range are less important than the feature points detected using the initial detection range.

Figure 13:
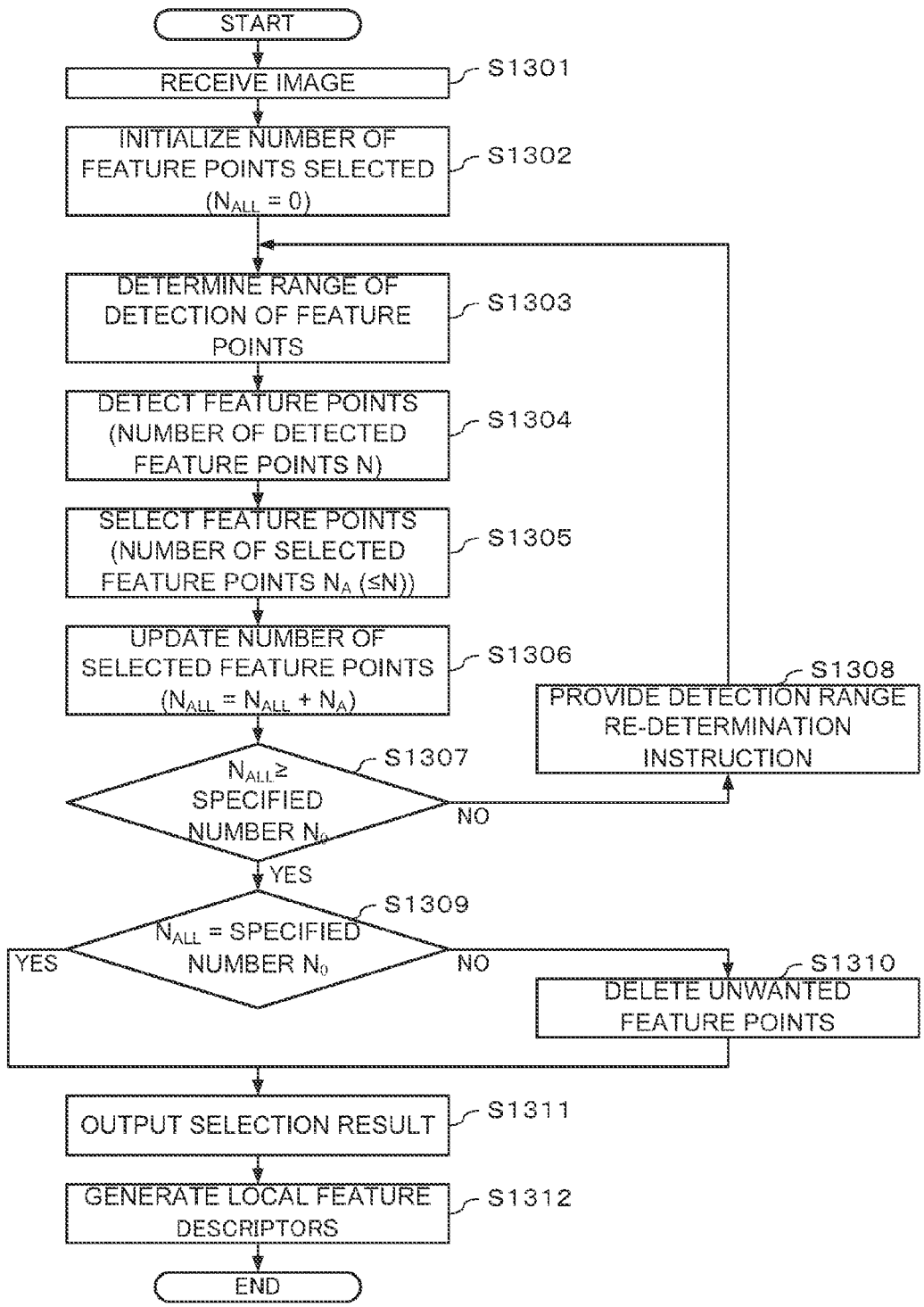
FIG. 13 is a flowchart showing an example of processing in the local feature descriptor extracting apparatus according to the fifth embodiment.

FIG. 13 is a flowchart showing an example of processing in the local feature descriptor extracting apparatus 1E. First, the detection range determining unit 62 receives an image for which local feature descriptors are to be generated (S1301). The feature point selecting unit 66 initializes a variable indicative of the number of selected feature points (S1302). In this case, a variable indicative of the total number of selected feature points is denoted by $N_{ALL}$, and $N_{ALL}$ is set to zero by initialization.

The detection range determining unit 62 determines the range of detection of feature points (S1303). As described above, the feature point detecting unit 52 may determine the range of detection of feature points so as to initially limit the number of feature points detected to a small value. The feature point detecting unit 64 detects feature points in the image within the determined range (S1304). In this case, a variable indicative of the number of feature points detected is denoted by N. The feature point selecting unit 66 selects feature points from the detected feature points (S1305). In this case, a variable indicative of the number of newly selected feature points is denoted by $N_A$. The feature point selecting unit 66 uses the number of the newly selected feature points to update the total number of selected feature points (S1306). Specifically, the total number of selected feature points is updated by calculating an equation $N_{ALL}=N_{ALL}+N_A$.

The feature point selecting unit 66 checks whether the total number of selected feature points $N_{ALL}$ is equal to or larger than a specified number $N_0$ (S1307). Then, when the total number of selected feature points $N_{ALL}$ is smaller than the specified number $N_0$ (S1307: NO), the feature point selecting unit 66 outputs a detection range re-determination instruction to the detection range determining unit 62 (S1308). Upon receiving the detection range re-determination instruction, the detection range determining unit 62 determines the range of detection of feature points so as to extend the detection range (S1303). Then, the feature point detecting unit 64 detects feature points within the re-determined detection range as described above (S1304). Then, the feature point selecting unit 66 selects feature points from newly selected feature points (S1305). Thus, the parameter is repeatedly changed until the total number of selected feature points becomes equal to or larger than the specified number.

When the total number of selected feature points $N_{ALL}$ is equal to or larger than the specified number $N_0$ (S1307: YES), the feature point selecting unit 66 checks whether the total number of selected feature points $N_{ALL}$ is equal to the specified number $N_0$ (S1309). When the total number of selected feature points $N_{ALL}$ is not equal to the specified number $N_0$ (S1309: NO), the feature point selecting unit 66 deletes unwanted feature points so as to make the total number of selected feature points equal to the specified number $N_0$ (S1310). For example, the feature point selecting unit 66 may make the total number of selected feature points equal to the specified number $N_0$ by deleting some of the selected feature points in order of increasing importance. The feature point selecting unit 66 then outputs the result of the selection of feature points to the local feature descriptor generating unit 14 (S1311). Finally, the local feature descriptor generating unit 14 generates local feature descriptors for the selected feature points and outputs the local feature descriptors in order of decreasing importance (S1312).

In the local feature descriptor extracting apparatus 1E, when the number of feature points selected from the detected feature points is smaller than the specified number, the feature point selecting unit 66 allows the detection range determining unit 62 to further determine the detection range. Thus, for example, the detection range determining unit 62 may initially determine the detection range so as to allow the feature point selecting unit 66 to detect only a small number of feature points and extend the detection range on a step by step basis until the number of feature points selected by the feature point selecting unit 66 becomes equal to the specified number. This process enables a reduction in the size of the local feature descriptor compared to the generation of local feature descriptors for all of a large number of detected feature points. Furthermore, when the detection range is limited in terms of a scale orientation or the spatial orientation, the range of targets for a process of detecting feature points using an extremum search may be minimized. This enables a reduction in time needed to select important feature point. Moreover, the feature points for which local feature descriptors are to be generated are selected in order of decreasing importance, and thus, the accuracy of object identification can be maintained.

Sixth Embodiment

Figure 14:
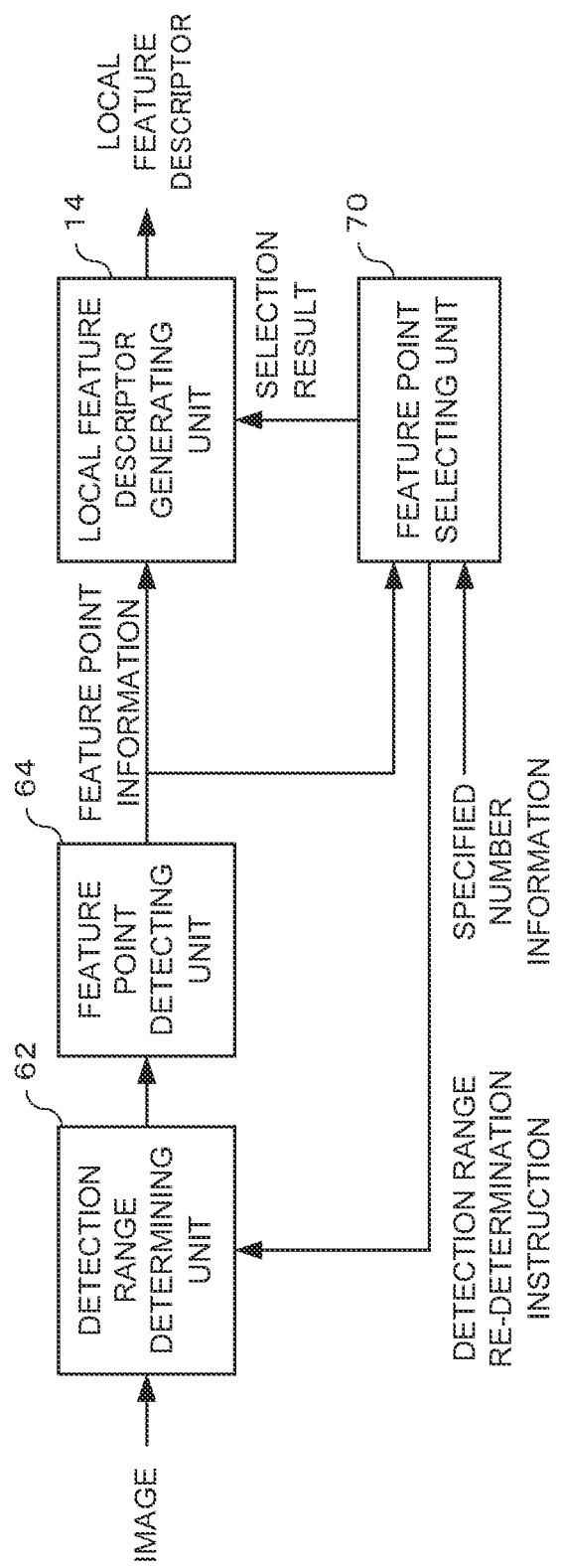
FIG. 14 is a diagram showing a configuration of a local feature descriptor extracting apparatus that is a sixth embodiment of the present invention.
Figure 15:
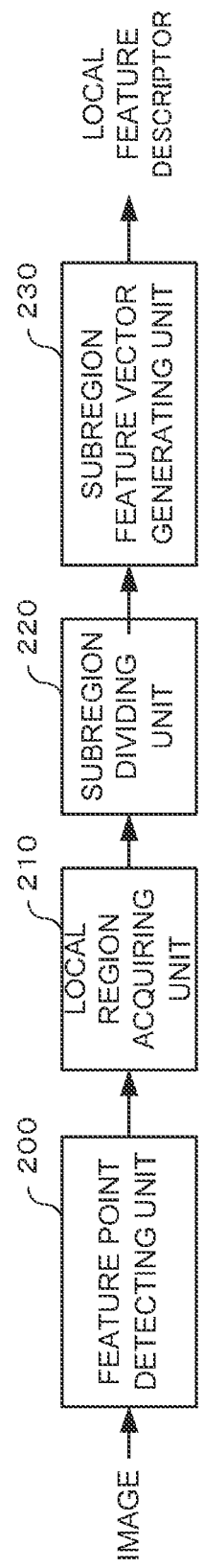
FIG. 15 is a diagram showing an example of a general configuration of a local feature descriptor extracting apparatus that uses SIFT feature descriptors.

Now, a sixth embodiment will be described. FIG. 14 is a diagram showing a configuration of a local feature descriptor extracting apparatus that is the sixth embodiment of the present invention. As shown in FIG. 14, a local feature descriptor extracting apparatus 1F is configured to include a detection range determining unit 62, a feature point detecting unit 64, a feature point selecting unit 70, and a local feature descriptor generating unit 14. Thus, in the local feature descriptor extracting apparatus 1F, the feature point selecting unit 66 in the local feature descriptor extracting apparatus 1E according to the fifth embodiment is changed to the feature point selecting unit 70. The same components of the sixth embodiment as the corresponding components of the fifth embodiment are denoted by the same reference numerals and will not be described below.

The feature point selecting unit 70 is different from the feature point selecting unit 66 in the local feature descriptor extracting apparatus 1E according to the fifth embodiment in that the feature point selecting unit 70 receives specified-number information that is information used to determine a specified number for selection of feature points. The feature point selecting unit 70 determines the specified number based on the specified-number information. The feature point selecting unit 70 then selects feature points and outputs a detection range re-determination instruction to the detection range determining unit 62 as necessary, as is the case with the fifth embodiment. The specified-number information may be information indicative of the specified number itself or information indicative of the total size (for example, the number of bytes) of local feature descriptors in an image. When the specified-number information is information indicative of the total size of the local feature descriptors in the image, the feature point selecting unit 70 may calculate the specified number by, for example, dividing the total size by the size of the local feature descriptor at one feature point.

Thus, in the local feature descriptor extracting apparatus 1F, the feature point selecting unit 70 may determine the specified number based on the externally input specified-number information. In other words, the number of feature points selected by the feature point selecting unit 70 may be controlled based on the external input to the local feature descriptor extracting apparatus 1F. Hence, the size of local feature descriptors may be controlled to a desired size with the accuracy of object identification maintained.

The embodiments are intended to facilitate understanding of the present invention and not intended to limit interpretation of the present invention. The present invention may be changed or improved without departing from the spirits thereof and includes equivalents thereof.

The application claims priority based on Japanese Patent Application No. 2011-253262 filed on Nov. 18, 2011 and incorporates the entirety of the disclosure of the publication herein.

The present invention has been described with reference to the embodiments, but is not limited to the above-described embodiments. Various changes understandable by those skilled in the art within the scope of the present invention may be made to the configurations and details of the present invention.

Some or all of the embodiments may alternatively be described as follows without limitation.

(Feature 1) A local feature descriptor extracting apparatus including a feature point detecting unit detecting a plurality of feature points in an image and outputting feature point information that is information on each of the feature points, a feature point selecting unit selecting the predetermined number of feature points from the detected plurality of feature points in order of decreasing importance based on the feature point information, and a local feature descriptor generating unit generating a local feature descriptor that is a feature descriptor in a local region for each of the selected feature points.

(Feature 2) The local feature descriptor extracting apparatus set forth in Feature 1, wherein the feature point information includes scale information indicative of a scale of each feature point, and the feature point selecting unit selects the predetermined number of feature points from the detected plurality of feature points in order of decreasing importance depending on the scale based on the scale information.

(Feature 3) The local feature descriptor extracting apparatus set forth in Feature 1, wherein the feature point selecting unit includes a feature point classifying unit classifying the detected plurality of feature points into a plurality of groups based on the feature point information and a typical-feature-point selecting unit selecting at least one feature point from each of the groups in order to select the predetermined number of feature points.

(Feature 4) The local feature descriptor extracting apparatus set forth in any one of Features 1 to 3, wherein the feature point selecting unit receives the specified-number of pieces of information that is information used to determine the predetermined number, and determines the predetermined number based on the specified-number of pieces of information.

(Feature 5) The local feature descriptor extracting apparatus set forth in any one of Features 1 to 4, wherein the feature point selecting unit causes the feature point detecting unit to further detect feature points when the number of the feature points selected from the detected plurality of feature points in order of decreasing importance is less than the predetermined number.

(Feature 6) The local feature descriptor extracting apparatus set forth in any one of Features 1 to 4, further including a detection range determining unit determining a detection range that is a range of detection of feature points in the image, wherein the feature point detecting unit detects the plurality of feature points within the determined detection range, and the feature point selecting unit causes the detection range determining unit to further determine the detection range when the number of the feature points selected from the detected plurality of feature points in order of decreasing importance is smaller than the predetermined number.

(Feature 7) A method for extracting a local feature descriptor wherein a computer detects a plurality of feature points in an image to output feature point information that is information on each of the feature points, selects the predetermined number of feature points from the detected plurality of feature points in order of decreasing importance based on the feature point information, and generates a local feature descriptor that is a feature descriptor in a local region for each of the selected feature points.

(Feature 8) A program causing a computer to implement a function of detecting a plurality of feature points in an image, a function of outputting feature point information that is information on each of the feature points, a function of selecting the predetermined number of feature points from the detected plurality of feature points in order of decreasing importance based on the feature point information, and a function of generating a local feature descriptor that is a feature descriptor in a local region for each of the selected feature points.

1A to 1F Local feature descriptor extracting apparatus
10, 52, 64 Feature point detecting unit
12, 50, 54, 60, 66, 70 Feature point selecting unit
14 Local feature descriptor generating unit
20 High-scale-order feature point selecting unit
22 Feature point classifying unit
24 Typical-feature-point selecting unit
26 Feature point random selection unit
28 Particular-scale-area feature point selecting unit
40 Local region acquiring unit
42 Subregion dividing unit
44 Subregion feature vector generating unit
62 Detection range determining unit

We claim:

1. A local feature descriptor extracting apparatus comprising:
a computer configured to perform
determining a detection range of feature points in an image,
detecting a plurality of feature points in the image within the determined detection range and output feature point information that is information on each of the feature points, the feature point information including scale information indicative of a scale of each feature point;
selecting a plurality of feature points from the detected plurality of feature points in an order based on the scale information included in the feature point information;
repeating said determining, detecting, and selecting until a number of the feature points selected from the detected plurality of feature points becomes equal to or larger than a predetermined number, and
generating a local feature descriptor that is a feature descriptor in a local region for each of the selected feature points; and
a memory storing the local feature descriptor for each of the selected features points.

2. The local feature descriptor extracting apparatus according to claim 1, wherein the computer
is configured to classify the detected plurality of feature points into a plurality of groups based on the feature point information; and
select at least one feature point from each of the groups in order to select the predetermined number of feature points.

3. The local feature descriptor extracting apparatus according to claim 1, wherein the computer is configured to receive the specified-number of pieces of information that is information used to determine the predetermined number, and determine the predetermined number based on the specified-number of pieces of information.

4. The local feature descriptor extracting apparatus according to claim 1, wherein the computer is configured to further detect feature points when the number of the feature points selected from the detected plurality of feature points is less than the predetermined number.

5. A method for extracting a local feature descriptor, the method comprising executing on a computer:
determining a detection range of feature points in an image;
detecting a plurality of feature points in the image within the determined detection range;
outputting feature point information that is information on each of the feature points, the feature point information including scale information indicative of a scale of each feature point;
selecting a plurality of feature points from the detected plurality of feature points in an order based on the scale information included in the feature point information;
repeating said determining, detecting, and selecting until a number of the feature points selected from the detected plurality of feature points becomes equal to or larger than a predetermined number;
generating a local feature descriptor that is a feature descriptor in a local region for each of the selected feature points; and
storing the local feature descriptor for each of the selected features points in a memory.

6. A computer-readable non-transitory storage medium storing a program for causing a computer to implement:
a function of determining a detection range of feature points in an image;
a function of detecting a plurality of feature points in the image within the determined detection range;
a function of outputting feature point information that is information on each of the feature points, the feature point information including scale information indicative of a scale of each feature point;
a function of selecting a plurality of feature points from the detected plurality of feature points in an order based on the scale information included in the feature point information;
a function of repeating said determining, detecting, and selecting until a number of the feature points selected from the detected plurality of feature points becomes equal to or larger than a predetermined number;

a function of generating a local feature descriptor that is a feature descriptor in a local region for each of the selected feature points; and a function of storing the local feature descriptor for each of the selected features points in a memory.

\* \* \* \* \*